United States Patent
Kuwamura et al.

(10) Patent No.: US 8,784,046 B2
(45) Date of Patent: Jul. 22, 2014

(54) TURBINE

(75) Inventors: Yoshihiro Kuwamura, Tokyo (JP);
Kazuyuki Matsumoto, Tokyo (JP);
Hiroharu Ooyama, Tokyo (JP);
Yoshinori Tanaka, Tokyo (JP); Asaharu Matsuo, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 365 days.

(21) Appl. No.: 13/386,084

(22) PCT Filed: Oct. 4, 2010

(86) PCT No.: PCT/JP2010/067350
§ 371 (c)(1),
(2), (4) Date: Jan. 20, 2012

(87) PCT Pub. No.: WO2011/043286
PCT Pub. Date: Apr. 14, 2011

(65) Prior Publication Data
US 2012/0121393 A1    May 17, 2012

(30) Foreign Application Priority Data
Oct. 9, 2009  (JP) .................................. 2009-235430

(51) Int. Cl.
*F01D 11/02*  (2006.01)
(52) U.S. Cl.
USPC ..................................... 415/173.5; 415/174.5
(58) Field of Classification Search
CPC .................................. F01D 11/00; F01D 11/02
USPC ......... 415/173.5, 174.5, 173.1, 230; 277/412, 277/418, 419
See application file for complete search history.

(56) References Cited

U.S. PATENT DOCUMENTS

| | | | |
|---|---|---|---|
| 4,662,820 A | | 5/1987 | Sasada et al. |
| 2009/0072487 A1 | | 3/2009 | Chougule et al. |

FOREIGN PATENT DOCUMENTS

| | | |
|---|---|---|
| CN | 2725533 | 9/2005 |
| DE | 2462465 A1 * | 4/1977 |

(Continued)

OTHER PUBLICATIONS

Chinese Office Action issued Nov. 18, 2013 in Chinese Patent Application No. 201080023193.2 with English translation.

(Continued)

*Primary Examiner* — Richard Edgar
(74) *Attorney, Agent, or Firm* — Wenderoth, Lind & Ponack, L.L.P.

(57) ABSTRACT

The turbine is provided with a blade (50) and a structure body (11) which rotates relatively with respect to the blade (50). A stepped part (52A) having a step surface (53A) is installed at one of the leading end of the blade (50) and the structure body (11) corresponding to the leading end thereof, while a seal fin (15A) which extends toward the stepped part (52A) to form a small space (H) is installed at the other of them. A cavity (C1) is formed between the blade (50) and the structure body (11) and also between the seal fin (15A) and the partition wall which faces thereto in the rotating shaft direction of the structure body (11) on the upstream side. When a distance of the cavity (C1) between the partition wall and the seal fin (15A) is given as a cavity width (W), and a distance between the seal fin (15A) and the end edge (55) of the stepped part (52A) in the rotating shaft direction on the upstream side is given as (L), at least one of the distances (L) satisfies the following formula (1).

$$0.7H \leq L \leq 0.3W \qquad (1).$$

12 Claims, 6 Drawing Sheets

(56) References Cited

FOREIGN PATENT DOCUMENTS

| | | |
|---|---|---|
| JP | 53-104803 | 8/1978 |
| JP | 59-51104 | 3/1984 |
| JP | 61-134501 | 8/1986 |
| JP | 63-61501 | 4/1988 |
| JP | 4-35601 | 6/1992 |
| JP | 4-350302 | 12/1992 |
| JP | 9-13905 | 1/1997 |
| JP | 10-311205 | 11/1998 |
| JP | 11-148307 | 6/1999 |
| JP | 11-148308 | 6/1999 |
| JP | 11-200810 | 7/1999 |
| JP | 2002-228014 | 8/2002 |
| JP | 2004-332616 | 11/2004 |
| JP | 2006-291967 | 10/2006 |
| JP | 2009-47043 | 3/2009 |
| JP | 2010-216321 | 9/2010 |
| JP | 2011-208602 | 10/2011 |

OTHER PUBLICATIONS

International Search Report issued Dec. 28, 2010 in International (PCT) Application No. PCT/JP2010/067350.

Written Opinion of the International Searching Authority issued Dec. 28, 2010 in International (PCT) Application No. PCT/JP2010/067350.

International Search Report issued Apr. 5, 2011 in International (PCT) Application No. PCT/JP2011/051895 w/English translation.

Written Opinion of the International Searching Authority issued Apr. 5, 2011 in International (PCT) Application No. PCT/JP2011/051895 w/English translation.

International Search Report issued Feb. 7, 2012 in International (PCT) Application No. PCT/JP2011/079808 w/English translation.

Written Opinion of the International Searching Authority issued Feb. 7, 2012 in International (PCT) Application No. PCT/JP2011/079808 w/English translation.

* cited by examiner

TURBINE

TECHNICAL FIELD

The present invention relates to a turbine, for example, that used in power stations, chemical plants, gas plants, iron mills and marine vessels.

The application concerned is to claim the right of priority to Japanese Patent Application No. 2009-235430 filed on Oct. 9, 2009 with the content included herein.

BACKGROUND ART

As is well known, there is available, as one type of steam turbine, that which is provided with a casing, a shaft body (rotor) installed inside the casing so as to be rotatable, a plurality of stationary blades arranged by being fixed to an inner circumference of the casing and a plurality of moving blades installed in a radial pattern on the shaft body on the downstream side of the plurality of stationary blades (downstream side of the flow of steam). Of these steam turbines, an impulse turbine converts pressure energy of steam to velocity energy by stationary blades and also coverts the velocity energy to rotational energy (mechanical energy) by moving blades. Further, a reaction turbine is that in which pressure energy is converted to velocity energy also inside moving blades and the velocity energy is converted to rotational energy (mechanical energy) by reaction force derived from ejection of steam.

In the above-described types of steam turbines, normally, a space is formed in the radial direction between the leading end of a moving blade and a casing which surrounds the periphery of the moving blade to form a flow channel of steam. A space is also formed in the radial direction between the leading end of a stationary blade and a shaft body. However, leakage steam passing to the downstream side through the space at the leading end of the moving blade will not impart torque to the moving blade. Further, in leakage steam which passes to the downstream side through the space at the leading end of the stationary blade, pressure energy is not converted to velocity energy by the stationary blade. Therefore, torque is hardly imparted to the moving blade on the downstream side. Therefore, in order to improve the performance of a steam turbine, it is important to reduce the amount of leakage steam which passes through the space at the leading end of the moving blade.

Patent Document 1 given below has proposed a structure which is provided at the leading end of a moving blade with stepped parts which are gradually increased in height from the upstream side toward the downstream side of the flow of steam (fluid) flowing in the axial direction (a direction parallel to a rotating shaft of the moving blade). In this structure, seal fins which have spaces with respect to the stepped part are provided.

According to such a configuration, the leakage flow of steam which has passed through the spaces of the seal fins collides with an end edge which forms a step surface of the stepped part to result in an increase in flow resistance of steam. Thereby, steam is reduced in the leakage flow rate.

PRIOR ART DOCUMENT

Patent Document

Patent Document 1: Japanese Published Unexamined Patent Application No. 2006-291967 (FIG. 4)

SUMMARY OF THE INVENTION

Problems to be Solved by the Invention

However, there has been a strong demand for improving the performance of steam turbines, therefore, a further reduction in the leakage flow rate of steam is required.

The present invention has been made in view of the above situation, an object of which is to provide a high performance turbine which is further reduced in the leakage flow rate of a fluid.

Means for Solving the Problems

The turbine of the present invention is provided with a blade and a structure body which is installed at the leading end side of the blade via a space and rotates relatively with respect to the blade. In this turbine, a stepped part having a step surface to project toward the other side is installed at one of the leading end side of the blade and a part of the structure body corresponding to the leading end thereof, while a seal fin which projects toward the stepped part to form a small space H with the stepped part is installed at the other of them. Here, between the leading end of the blade and the part of the structure body, there is formed a cavity between the seal fin and a partition wall opposing the seal fin on the upstream side in a direction of the rotating shaft of the structure body. Further, a distance of the cavity between the partition wall and the seal fin is given as a cavity width W. At this time, a distance between the seal fin and an end edge of the stepped part on the upstream side in the direction of the rotating shaft is given as L. At least one of the distances L satisfies the following formula (1).

$$0.7H \leq L \leq 0.3W \tag{1}$$

That is, the above-described turbine is a turbine for converting energy of a fluid to rotational energy. A first aspect of the turbine includes the following: a blade; a structure body which has a space with the leading end of the blade and rotates relatively with respect to the blade; a stepped part which has a step surface and is installed at the leading end of the blade to project toward the structure body; a seal fin which is installed at the structure body to extend toward the stepped part; a partition wall which faces the seal fin at the upstream side of the flow of the fluid in a direction parallel to the blade or the rotating shaft of the structure body; and a cavity which is formed between the leading end of the blade and the structure body and also between the partition wall and the seal fin.

Further, a second aspect of the turbine includes the following: a blade; a structure body which has a space with the leading end of the blade and rotates relatively with respect to the blade; a stepped part which has a step surface and is installed at the structure body to project toward the leading end of the blade; a seal fin which is installed at the leading end of the blade to extend toward the stepped part; a partition wall which faces the seal fin at the upstream side of the flow of the fluid in a direction parallel to the blade or the rotating shaft of the structure body; and a cavity which is formed between the leading end of the blade and the structure body and also between the partition wall and the seal fin.

In the first aspect and the second aspect of the turbine, a small space formed between the seal fin and the stepped part is given as H. Further, a distance between the partition wall and the seal fin which form the cavity is given as a cavity width W. Still further, a distance between the seal fin and an end edge of the stepped part on the upstream side is given as L. At this time, at least one of the distances L satisfies the above-described formula (1).

According to this turbine, a fluid which has flowed into the cavity collides with a step surface which forms an end edge of the stepped part, that is, a surface of the stepped part which faces the upstream side of the flow of the fluid, thereby producing a primary vortex which turns in a first direction so as to return to the upstream side. Further, at this time, particularly at the end edge (edge) of the step surface, some flow is separated from the primary vortex. Thereby, there is caused a separation vortex rotating in a reverse direction to the first direction. This separation vortex exhibits a flow contraction effect which reduces the leakage flow that passes through a small space H between the leading end of the seal fin and the stepped part. However, the flow contraction effect by the separation vortex varies depending, in particular, on a relationship between a position of the end edge (distance L from the seal fin) and dimensions of the small space H and also a relationship with the cavity width W.

Therefore, based on simulation results to be described later, these relationships have been specified so as to satisfy the above formula (1). Thereby, the flow contraction effect can be sufficiently increased by the separation vortex to further reduce the leakage flow rate of a fluid.

Moreover, in the turbine, the distance L may satisfy the following formula (2).

$$1.25H \leq L \leq 2.75H (\text{however}, L \leq 0.3W) \quad (2)$$

Thereby, as shown in the simulation results to be described later, the flow contraction effect by the separation vortex is further increased to further reduce the leakage flow rate of a fluid.

Still further, in the above-described turbine, the stepped parts may be installed in a plural number in such a manner that the projection height becomes gradually higher from the upstream side toward the downstream side in the direction of the rotating shaft. The seal fin which extends toward each of the stepped parts may be installed at the other side. The seal fin corresponding to the stepped part may be the partition wall opposing a seal fin corresponding to a stepped part adjacent to the downstream side in the direction of the rotating shaft.

That is, in the first aspect of the turbine, a plurality of the stepped parts may be installed in such a manner that the projection height toward the structure body becomes gradually higher from the upstream side toward the downstream side of the flow of the fluid in a direction parallel to the rotating shaft. Further, the structure body may be provided with seal fins corresponding to each of the stepped parts. Still further, the seal fin corresponding to the stepped part may be the partition wall which faces a seal fin corresponding to a stepped part adjacent to the downstream side.

In the second aspect of the turbine, the stepped parts may be installed in a plural number in such a manner that the projection height toward the leading end of the blade becomes gradually higher from the upstream side toward the downstream side of the flow of the fluid in a direction parallel to the rotating shaft. Still further, the seal fin may be installed at the leading end of the blade so as to correspond to each of the stepped parts. In addition, the seal fin corresponding to the stepped part may be the partition wall which faces a seal fin corresponding to a stepped part adjacent to the downstream side.

Accordingly, the flow contraction effect by the separation vortex can be obtained at every stepped part. Therefore, the fluid can be sufficiently reduced in the leakage flow rate between the blade and the structure body.

In this turbine, a part of the structure body corresponding to the leading end of the blade may be an annular recess in which the rotating shaft is given as a central axis. Further, the partition wall which faces the seal fin corresponding to the stepped part positioned on the uppermost stream side may be formed by an inner wall surface of the recess on the upstream side.

Therefore, it is possible to obtain the flow contraction effect by the separation vortex even at the stepped part positioned on the uppermost stream side of the flow of the fluid in a direction parallel to the blade or the rotating shaft of the structure body. As a result, the fluid can be sufficiently reduced in the leakage flow rate between the blade and the structure body.

Effect of the Invention

The present invention is able to provide a high performance turbine which is further reduced in the leakage flow rate of a fluid.

MODE FOR CARRYING OUT THE INVENTION

Hereinafter, a description will be given in detail for the embodiments of the present invention with reference to the drawings.

First Embodiment

Figure 1:
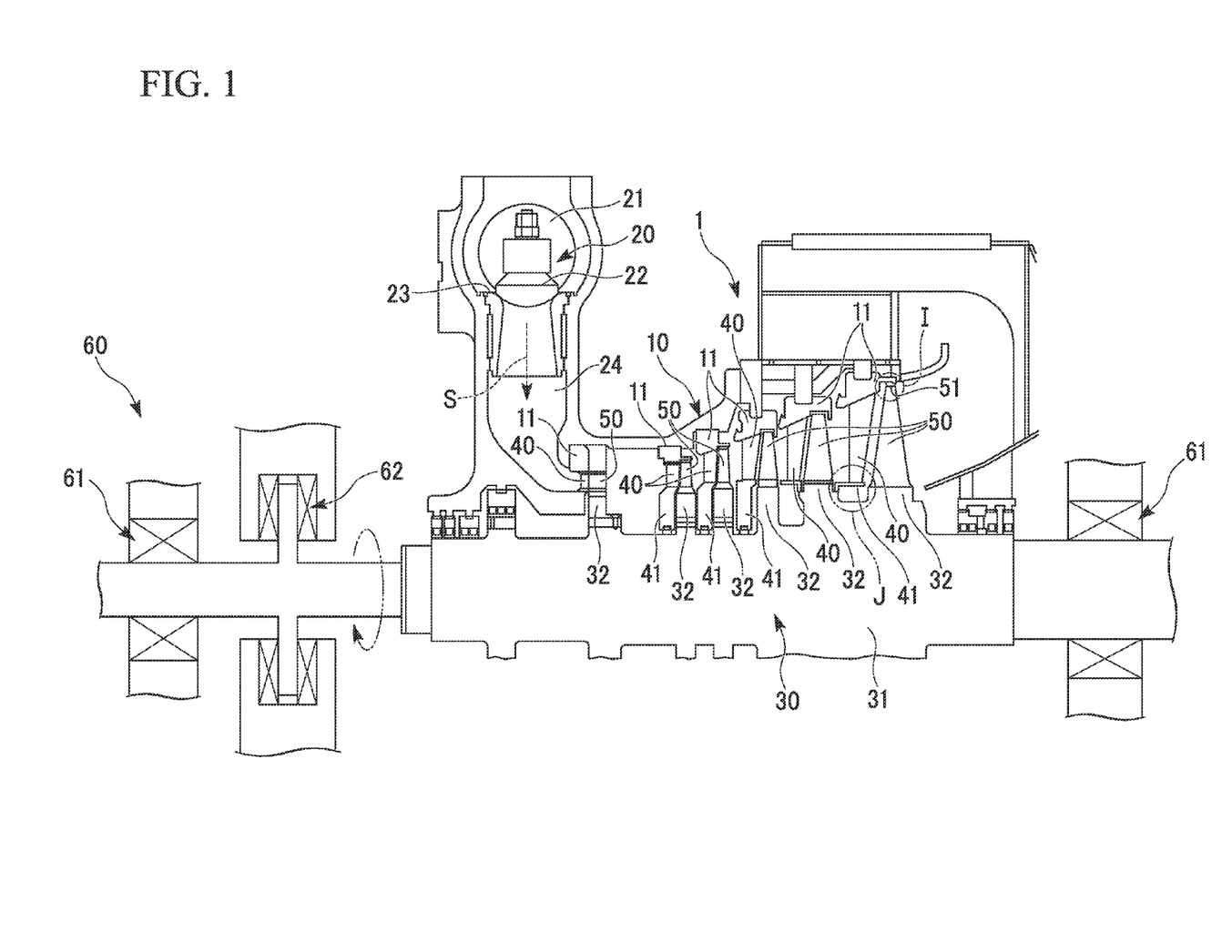
FIG. 1 is a schematic configuration sectional view which shows a steam turbine of the present invention.

FIG. 1 is a schematic configuration sectional view which shows a steam turbine 1 of a first embodiment of the present invention.

The steam turbine 1 mainly includes the following configurations: a casing 10; a regulating valve 20 which regulates the amount and pressure of steam S flowing into the casing 10; a shaft body (rotor) 30 which is installed inside the casing 10 so as to rotate freely and transmits power to a machine such as a generator (not illustrated); a stationary blade 40 retained on the casing 10; a moving blade 50 installed on the shaft body 30; and a bearing part 60 which supports the shaft body 30 so as to be axially rotatable.

The casing 10 forms a flow channel of steam S, with an inner space sealed hermetically. A ring-shaped partition plate outer wheel 11 is firmly fixed on an inner wall surface of the casing 10. The shaft body 30 is arranged so as to penetrate the partition plate outer wheel 11. In the present embodiment, the partition plate outer wheel 11 corresponds to a "structure body" in the present invention.

The regulating valves 20 are installed inside the casing 10 in a plural number. Each of the regulating valves 20 is provided with a regulating valve chamber 21 into which steam S flows from a boiler (not illustrated), a valve body 22 and a valve seat 23. When the valve body 22 of the regulating valve 20 moves apart from the valve seat 23, a steam flow channel is opened, by which the steam S flows into an inner space of the casing 10 via a steam chamber 24.

The shaft body 30 is provided with a shaft main body 31 and a plurality of disks 32 extended in the radial direction from an outer circumference of the shaft main body 31. The shaft body 30 transmits rotational energy to a machine such as a generator (not illustrated).

In the following description, unless otherwise specified, the radial direction of the shaft body 30 or the shaft main body 31 is simply referred to as the "radial direction." A direction parallel to the shaft body 30 or the rotating shaft of the shaft main body 31 is simply referred to as the "rotating shaft direction" or the "axial direction."

A large number of the stationary blades 40 are arranged in a radial pattern so as to surround the shaft body 30. The plurality of stationary blades 40 which are thus arranged configure groups of annular stationary blades. The stationary blades 40 are individually retained by the previously described partition plate outer wheel 11. These stationary blades 40 are coupled at their inner parts in the radial direction (on the side of the rotating shaft) with ring-shaped hub shrouds 41. The shaft body 30 is arranged so as to penetrate the hub shrouds 41. The leading end of the stationary blade 40 is disposed, with a space kept with respect to the shaft body 30 in the radial direction.

Groups of annular stationary blades made up with the plurality of stationary blades 40 are formed in a plural number, with an interval kept therebetween in the rotating shaft direction (six groups in the present embodiment). The groups of annular stationary blades convert the pressure energy of steam S to velocity energy, thereby guiding the steam S to the moving blades 50 side adjacent to the downstream side.

The moving blade 50 is firmly attached to an outer circumference of the disk 32 on the shaft body 30. A large number of the moving blades 50 are arranged in the radial direction in a radial pattern on the downstream side of the flow of a fluid in each group of annular stationary blades. The thus arranged plurality of moving blades 50 configures a group of annular moving blades. In the present embodiment, the moving blade 50 corresponds to the "blade" in the present invention.

One stage is configured with one set of a group of annular stationary blades and a group of annular moving blades. That is, the steam turbine 1 is configured in a multiple stage (six stages in the present embodiment). Of these stages, a tip shroud 51 extending toward a circumferential direction of the group of annular moving blades is installed at the leading end of the moving blade 50 in the final stages.

Figure 2:
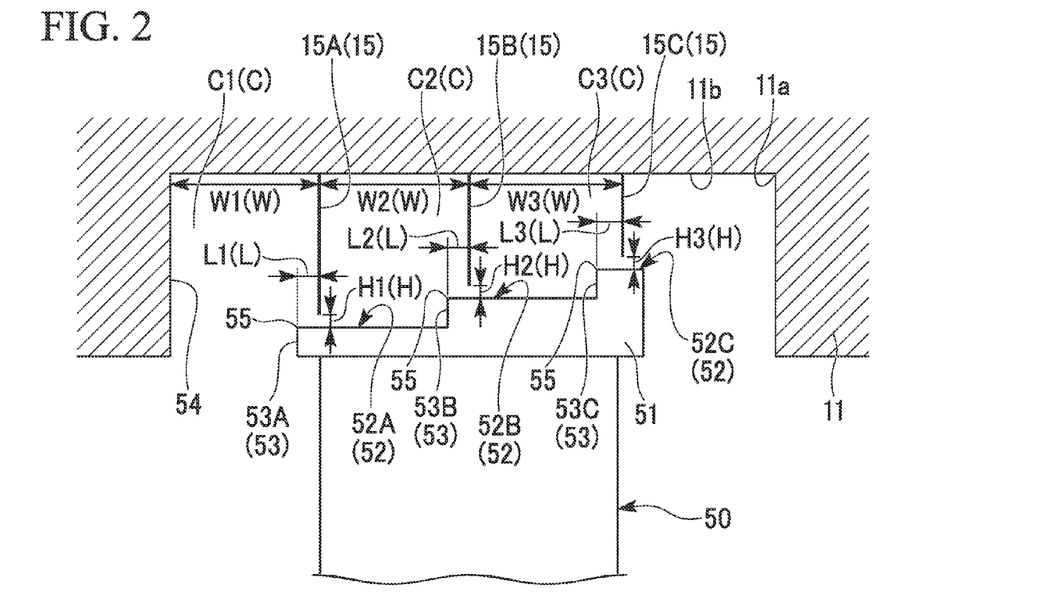
FIG. 2 is a drawing which shows a first embodiment of the present invention and an enlarged sectional view which shows a major part I given in FIG. 1.

FIG. 2 is an enlarged sectional view which shows the major part I given in FIG. 1.

As shown in FIG. 2, the tip shroud 51, which is the leading end of the moving blade (blade) 50, is arranged so as to face, with a space kept in the radial direction between the tip shroud 51 and the partition plate outer wheel (structure body) 11. Stepped parts 52 (52A to 52C) are formed at the tip shroud 51.

These stepped parts 52 (52A to 52C) have step surfaces 53 (53A to 53C) and project toward the partition plate outer wheel 11.

In the present embodiment, the tip shroud 51 is provided with the three stepped parts 52 (52A to 52C). These three stepped parts 52A to 52C are installed in such a manner that the projection height in the radial direction toward the partition plate outer wheel 11 becomes gradually higher from the upstream side toward the downstream side of steam (fluid) S in the rotating shaft direction (hereinafter, referred to as axial direction). That is, the stepped parts 52A to 52C are formed to face forward so that the step-forming step surfaces 53 (53A to 53C) face the upstream side of the steam S in the axial direction.

In the following description, unless otherwise specified, the upstream side of the flow of the steam S in the axial direction, with no vortex taken into account, is simply referred to as "upstream side." Further, the downstream side of the flow of the steam S in the axial direction, with no vortex taken into account, is simply referred to as "downstream side."

The partition plate outer wheel 11 is provided at a part corresponding to the tip shroud 51 with an annular groove (annular recess) 11a. The tip shroud 51 is housed inside the annular groove 11a.

In the present embodiment, the partition plate outer wheel 11 on the groove bottom surface 11b of the annular groove 11a is substantially equal in inner diameter in the axial direction. Further, the groove bottom surface 11b is provided with three seal fins 15 (15A to 15C) extending toward the tip shroud 51 internally in the radial direction.

Each of the seal fins 15 (15A to 15C) is installed so as to correspond to each of the stepped parts 52 (52A to 52C) on a one-to-one basis. Each of the seal fins 15 is installed so as to extend from the groove bottom 11b to the partition plate outer wheel 11 in the radial direction. A small space H is formed in the radial direction between each of the seal fins and each of the stepped parts 52. Each of the small spaces H (H1 to H3) is set to the minimum dimensional value within a safety range in which the casing 10 is not in contact with the moving blades 50, with consideration given to elongation of the casing 10 and the moving blades 50 resulting from heat (thermal elongation) and elongation of the moving blades 50 due to centrifugal force (centrifugal elongation), and so on. In the present embodiment, H1 to H3 are all equal in dimensions. However, these dimensions may be changed as necessary.

According to the above-described configuration, there are formed cavities C (C1 to C3) inside the annular groove 11a between the tip shroud 51 and the partition plate outer wheel 11. It is noted that one cavity C (C1 to C3) is formed at one stepped part 52 (52A to 52C).

The cavities C (C1 to C3) are formed between seal fins 15 corresponding to each of the stepped parts 52 and a partition wall opposing the seal fins 15 on the upstream side.

The step 52A, which is a first stage, is positioned on the uppermost stream side. In the first cavity C1 corresponding to the step 52A, the inner wall surface 54 of the annular groove 11a on the upstream side forms a partition wall.

Therefore, the first cavity C1 is formed between the tip shroud 51 and the partition plate outer wheel 11 and also between the inner wall surface (partition wall) 54 and the seal fin 15A corresponding to the step 52A, which is the first stage.

Further, in the second cavity C2 corresponding to the step 52B, which is a second stage, the seal fin 15A corresponding to the stepped part 52A positioned on the upstream side forms a partition wall.

Therefore, the second cavity C2 is formed between the tip shroud 51 and the partition plate outer wheel 11 and also between the seal fin (partition wall) 15A and the seal fin 15B.

Similarly, the third cavity C3 is formed between the tip shroud 51 and the partition plate outer wheel 11 and also between the seal fin (partition wall) 15B and the seal fin 15C.

In these cavities C (C1 to C3), the distance between the leading end of each of the seal fins 15 (15A to 15C) and the partition wall in the axial direction is given as a cavity width W (W1 to W3). That is, the cavity width W (W1 to W3) is the distance between the leading end of each of the seal fins 15 (15A to 15C) and the partition wall which is on the same diameter with the leading end of each of the seal fins 15.

That is, at the first cavity C1, a distance between the inner wall surface (partition wall) 54 and the seal fin 15A is given as the cavity width W1. In the second cavity C2, a distance between the seal fin (partition wall) 15A and the seal fin 15B is given as the cavity width W2. In the third cavity C3, a distance between the seal fin (partition wall) 15B and the seal fin 15C is given as the cavity width W3. In the present embodiment, W1 to W3 are all equal in dimensions. However, the dimensions may be changed as necessary.

Further, a distance between each of the seal fins 15 and the end edge 55 of each of the corresponding stepped parts 52 on the upstream side in the axial direction, that is, the distance between each of the seal fins 15 and the edge 55 of each of the step surfaces 53 in the axial direction is given as L (L1 to L3). Here, at least one of the distances L satisfies the following formula (1).

$$0.7H \leq L \leq 0.3W \quad (1)$$

Still further, at least one of the distances L may satisfy the following formula (2).

$$1.25H \leq L \leq 2.75H (\text{however, } L \leq 0.3W) \quad (2)$$

If the conditions of the above formula (1) or the formula (2) are satisfied, it is possible to obtain the flow contraction effect intended by the present invention, irrespective of operating conditions of the turbine. However, even if the conditions of the formula (1) or the formula (2) are satisfied when the turbine is halted, no intended effect can be obtained unless the conditions are satisfied when the turbine is in operation. Therefore, the conditions of the formula (1) or the formula (2) must be satisfied when the turbine is in operation.

Moreover, in the present embodiment, H1 to H3 are all equal in dimensions. Thus, H is a representative value of H1 to H3. Similarly, W is a representative value of W1 to W3.

The bearing part 60 given in FIG. 1 is provided with a journal bearing device 61 and a thrust bearing device 62 to support the shaft body 30 so as to be rotatable.

Next, a description will be given of actions of the above-configured steam turbine 1 with reference to FIG. 1 to FIG. 3.

First, when the regulating valve 20 (refer to FIG. 1) shown in FIG. 1 is brought into an open state, the steam S flows into an internal space of the casing 10 from a boiler (not illustrated).

The steam S which has flowed into the internal space of the casing 10 sequentially passes through groups of annular stationary blades and groups of annular moving blades in individual stages. At this time, pressure energy of the steam S is converted to velocity energy by the stationary blades 40. Most of the steam S which has passed through the stationary blades 40 flows in between the moving blades 50 which are at the same stage with the stationary blades 40. Then, the velocity energy of the steam S is converted to rotational energy by the moving blades 50, thereby allowing the shaft body 30 to rotate. On the other hand, some of the steam S (for example, several percentages) flows into the annular groove 11a after flowing out from the stationary blades 40, which is a so-called leakage steam.

Figure 3:
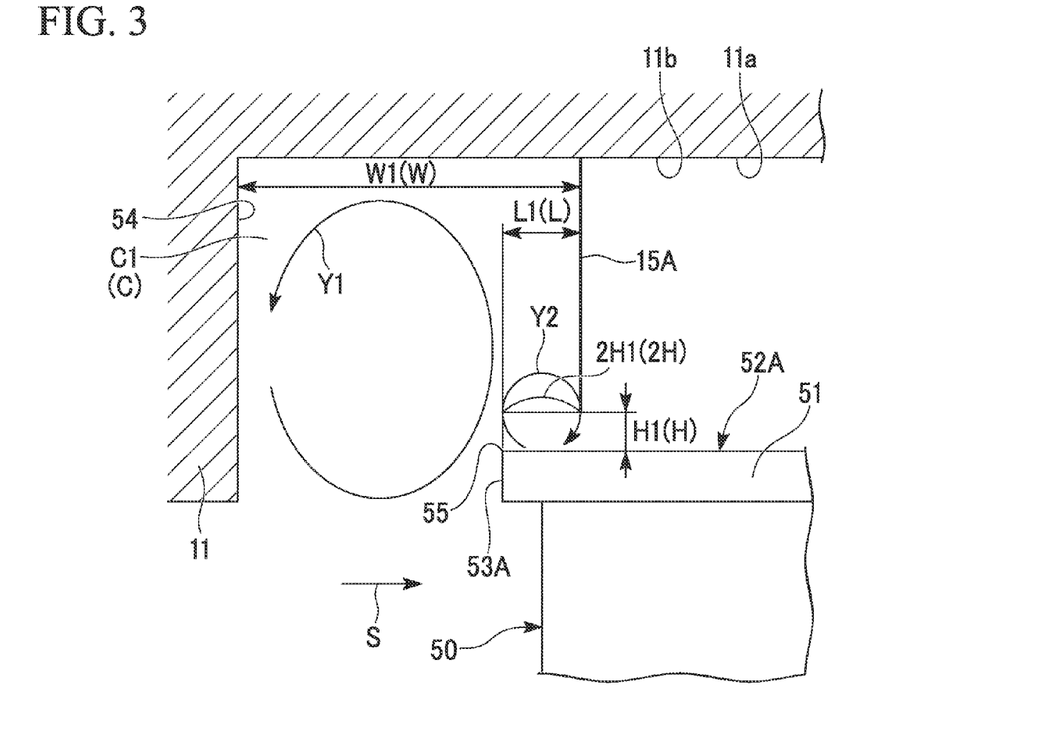
FIG. 3 is a drawing which describes actions of the steam turbine of the first embodiment of the present invention.

Here, as shown in FIG. 3, the steam S which has flowed into the annular groove 11a first flows into the first cavity C1. Thereafter, the steam S collides with the step surface 53A of the stepped part 52A. Then, the steam S produces a primary vortex Y1 so as to return to the upstream side. In this example, the primary vortex Y1 rotates counterclockwise (first direction) on the paper in FIG. 3.

At this time, in particular, at the end edge (edge) 55 of the stepped part 52A, some flow is separated from the primary vortex Y1. Thereby, a separation vortex Y2 is produced so as to rotate in a reverse direction to the primary vortex Y1. In this example, the separation vortex Y2 is produced so as to rotate clockwise (second direction) on the paper of FIG. 3. The separation vortex Y2 exhibits the flow contraction effect which reduces the leakage flow of the steam S passing through the small space H1 between the seal fin 15A and the stepped part 52A.

That is, as shown in FIG. 3, upon production of the separation vortex Y2, the separation vortex Y2 causes a downflow on the upstream side of the seal fin 15A. In the downflow, a velocity vector points inside in the radial direction (the side of the rotating shaft). The downflow has an inertial force moving toward the inside in the radial direction immediately before the small space H1. Therefore, the separation vortex Y2 exhibits an effect (flow contraction effect) which contracts the leakage flow of the steam S which passes through the small space H1 toward the inside of the radial direction. Thereby, the steam S is reduced in the leakage flow rate.

For example, as shown in FIG. 3, the separation vortex Y2 is assumed to form a perfect circle. Then, where the separation vortex Y2 is two times greater in diameter than the small space H1 and the outer circumference thereof is in contact with the seal fin 15A, that is, L1 is equal to 2H1 (L=2H), a position at which a velocity component facing inside in the radial direction in the downflow of the separation vortex Y2 is the maximum coincides with the leading end of the seal fin 15A (inner end edge). Therefore, since the downflow passes more favorably immediately before the small space H1, the flow contraction effect on leakage flow of the steam S is considered to be maximal.

Based on an understanding that there are available conditions under which the flow contraction effect is sufficiently obtained as described above, the present inventor ran a simulation. As a result, the present inventor has determined the distance L (L1 to L3) in the axial direction between each of the seal fins 15 (15A to 15C) and the end edge (edge) 55 of each of the step surfaces 53 (53A to 53C) so as to satisfy the formula (1) above. Alternatively, the present inventor has determined the distance L (L1 to L3) so as to satisfy the formula (2).

(Simulation)

Here, a simulation was run with regard to conditions among the distances L, the small spaces H of the seal fins 15 and the cavity widths W shown in FIG. 2 and FIG. 3 as well as a relationship between a change in turbine efficiency and a rate of change in leakage amount. Hereinafter, a description will be given of the results.

Figure 4:
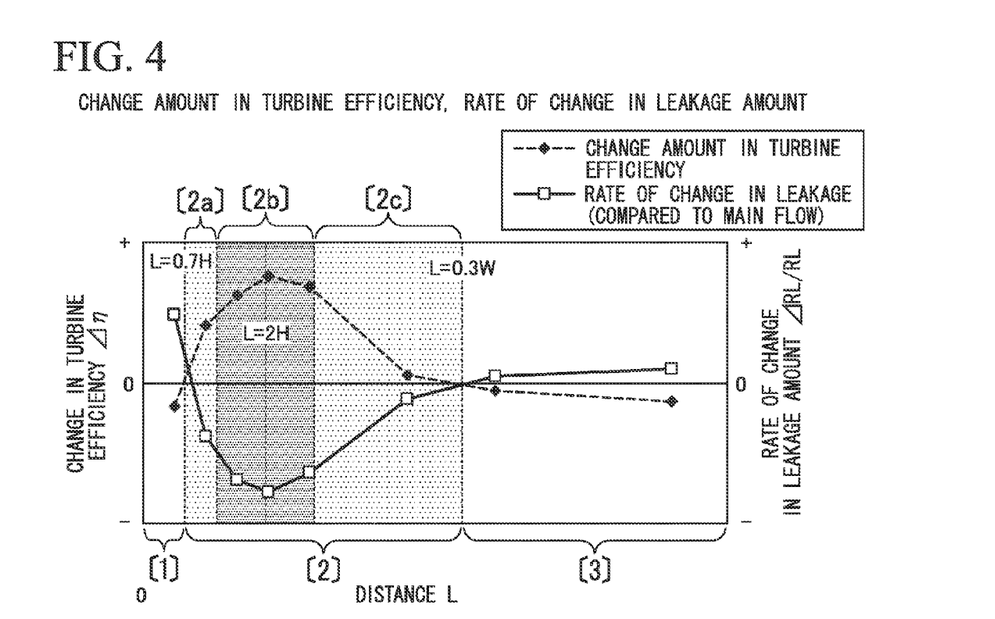
FIG. 4 is a graph which shows the simulation results.

FIG. 4 is a graph which shows the simulation results. In this graph, the horizontal axis shows dimensions (length) of the L, while the vertical axis shows a change in turbine efficiency and a rate of change in leakage amount. The change in turbine efficiency and the rate of change in leakage amount indicate magnitude of the turbine efficiency and leakage flow rate in a general step fin structure. Further, in this graph, a general arithmetic scale is used for both the horizontal axis and the vertical axis in place of a special scale such as a logarithm.

Based on the results shown in FIG. 4, it has been found that L is preferably in a range of satisfying the following formula (1) and more preferably in the range of satisfying the formula (2).

$$0.7H \leq L \leq 0.3W \quad (1)$$

$$1.25H \leq L \leq 2.75H \text{(however, } L \leq 0.3W) \quad (2)$$

Figure 5:
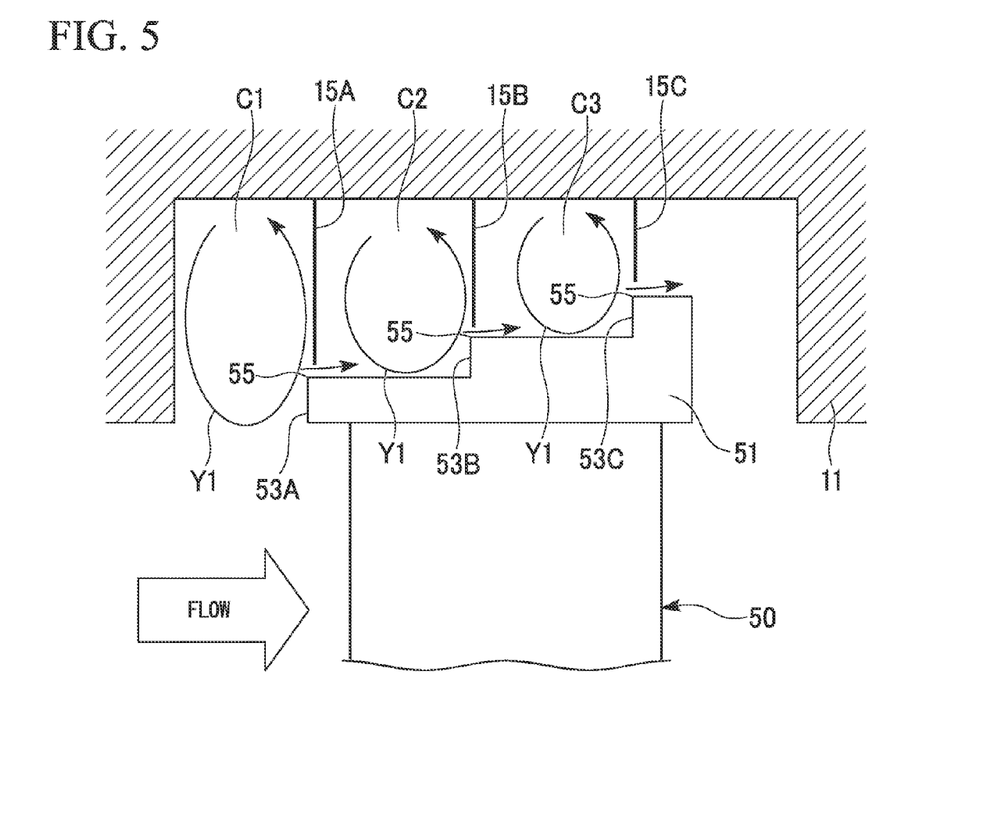
FIG. 5 is a drawing which describes a flow pattern in a range [1] given in FIG. 4.

That is, as shown in FIG. 5, no separation vortex Y2 is produced at the end edge (edge) 55 in the range [1] shown in FIG. 4 (L<0.7H). Therefore, it has been found that no downflow is formed on the upstream side of the seal fin 15. Thus, the flow contraction effect on leakage flow of the steam S by the downflow is hardly obtained. As a result, as shown in FIG. 4, the rate of change in leakage amount is high (+ side) and the steam S is increased in the leakage flow rate. Therefore, the change in turbine efficiency is low (− side) and the turbine efficiency is reduced accordingly.

Figure 6:
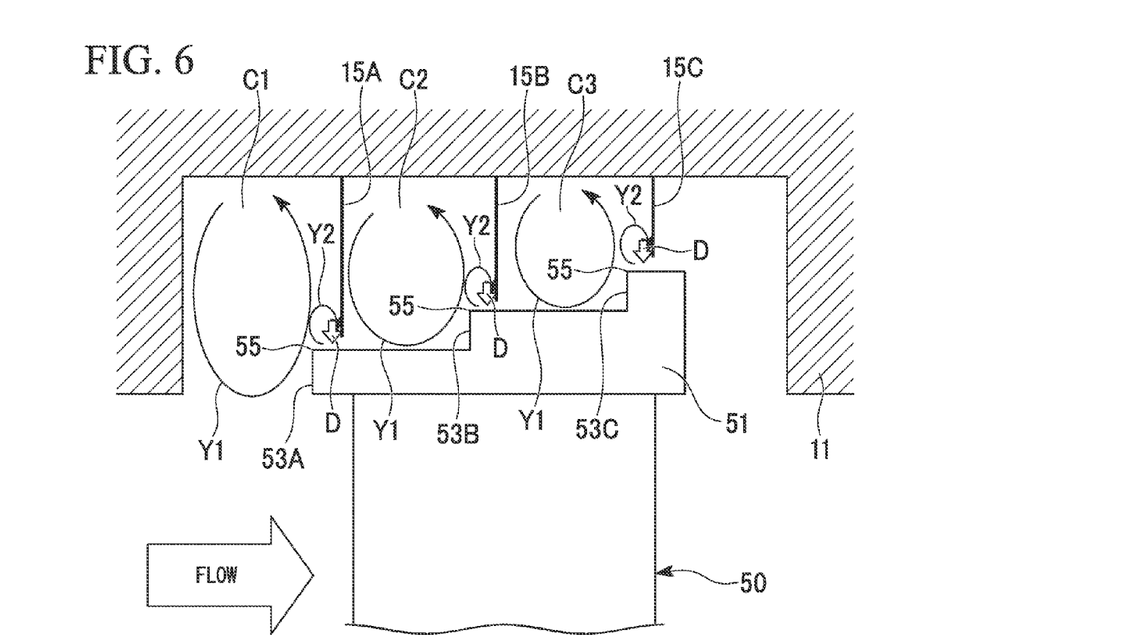
FIG. 6 is a drawing which describes a flow pattern in a range [2] given in FIG. 4.

In the range [2] shown in FIG. 4 (0.7H≤L≤0.3W), that is, in a range of the formula (1), the separation vortex Y2 is produced at the end edge (edge) 55 as shown in FIG. 6. Then, it has been found that a part of the separation vortex Y2 which is strong in downflow (an arrow D) is positioned in the vicinity of the leading end of the seal fin 15. Therefore, the flow contraction effect on leakage flow of the steam S by the downflow is sufficiently obtained. As a result, as shown in FIG. 4, the rate of change in leakage amount is low (− side) and the steam S is reduced in the leakage flow rate. Thereby, the change in turbine efficiency is high (+ side) to increase the turbine efficiency.

In a range [2a] (0.7H≤L≤1.25H) shown in FIG. 4, the separation vortex Y2 is produced at the end edge (edge) 55. However, in this case, it has been found that the produced separation vortex Y2 is relatively small. It has been also found that a part D which is strongest in downflow is at a position corresponding to a small space H inside (on the side of the rotating shaft) in the radial direction from the leading end of the seal fin 15. Therefore, as shown in FIG. 4, it is possible to sufficiently obtain the flow contraction effect on leakage flow of the steam S by the downflow. However, the flow contraction effect on leakage flow of the steam S is lower than that in a range [2b] to be described later.

It has been found that a strong separation vortex Y2 is produced at the end edge (edge) 55 in the range [2b] (1.25H≤L≤2.75H) shown in FIG. 4, and the part D of the separation vortex Y2 strongest in downflow substantially corresponds to the leading end of the seal fin 15. Therefore, as shown in FIG. 4, the flow contraction effect on leakage flow of steam S by the downflow becomes the highest.

In particular, as previously described, in the vicinity of L=2H, the steam S is to be minimal in leakage flow rate and the turbine efficiency is to be maximal.

Further, it has been found that the separation vortex Y2 produced by the end edge (edge) 55 is increased in a range [2c] (2.75H<L≤0.3W) shown in FIG. 4 and the part D strongest in downflow begins to move away from the leading end of the seal fin 15 to the outside in the radial direction. Therefore, as shown in FIG. 4, the flow contraction effect on leakage flow of the steam S by the downflow is sufficiently obtained. However, the flow contraction effect is lower than that in the range [2b].

Figure 7:
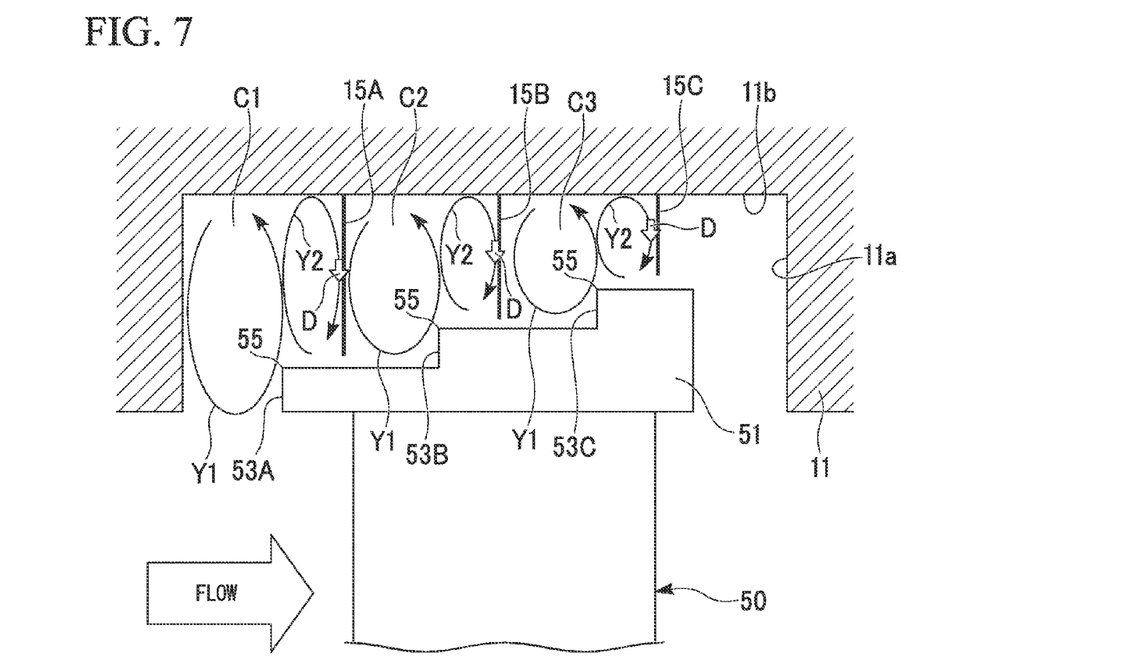
FIG. 7 is a drawing which describes a flow pattern in a range [3] given in FIG. 4.

Still further, in the range [3] (0.3W<L) shown in FIG. 4, the separation vortex Y2 produced at the end edge (edge) 55 is adhered to the groove bottom surface 11b of the annular groove 11a to produce a large vortex as shown in FIG. 7.

Therefore, the part D of the separation vortex Y2 strong in downflow moves to around at a midpoint of the height of the seal fin 15. Thus, it has been found that no strong downflow is produced at the leading end part of the seal fin 15. As a result, the flow contraction effect on leakage flow of the steam S by the downflow is minimal. As shown in FIG. 4, the rate of change in leakage amount is high (+ side), that is, the steam S is increased in the leakage flow rate. Thereby, the change in turbine efficiency is low (− side), that is, the turbine efficiency is reduced.

Based on the above-described simulation results, in the present invention, a distance L is in such a range so as to satisfy the formula (1) above.

That is, in each of the cavities C1 to C3, the above formula (1) is satisfied by a mutual positional relationship (small space H and distance L) between each of the stepped parts 52A to 52C and each of the seal fins 15A to 15C corresponding thereto and also a mutual positional relationship (cavity width W) between each of the partition walls and each of the seal fins 15A to 15C. Therefore, the flow contraction effect by the separation vortex Y2 is sufficiently increased, and the steam S is drastically reduced in the leakage flow rate compared to conventional cases. Therefore, the steam turbine 1 having the above-described seal structure is further reduced in the leakage flow rate of the steam S and increased in performance.

Further, if a small space H, a distance L and a cavity width W satisfy the relationship of the formula (2), the flow contraction effect by the separation vortex Y2 is further increased and the steam S is further reduced in the leakage flow rate. Therefore, the steam turbine 1 is further increased in performance.

Still further, the steam turbine 1 is provided with the stepped parts which are formed in three stages and also the three cavities C. Thereby, the steam S is reduced in the leakage flow rate at each of the cavities C by the previously described flow contraction effect. Thus, the steam S can be reduced in the leakage flow rate more sufficiently as a whole.

Second Embodiment

Next, a description will be given of the steam turbine of the second embodiment of the present invention.

Figure 8:
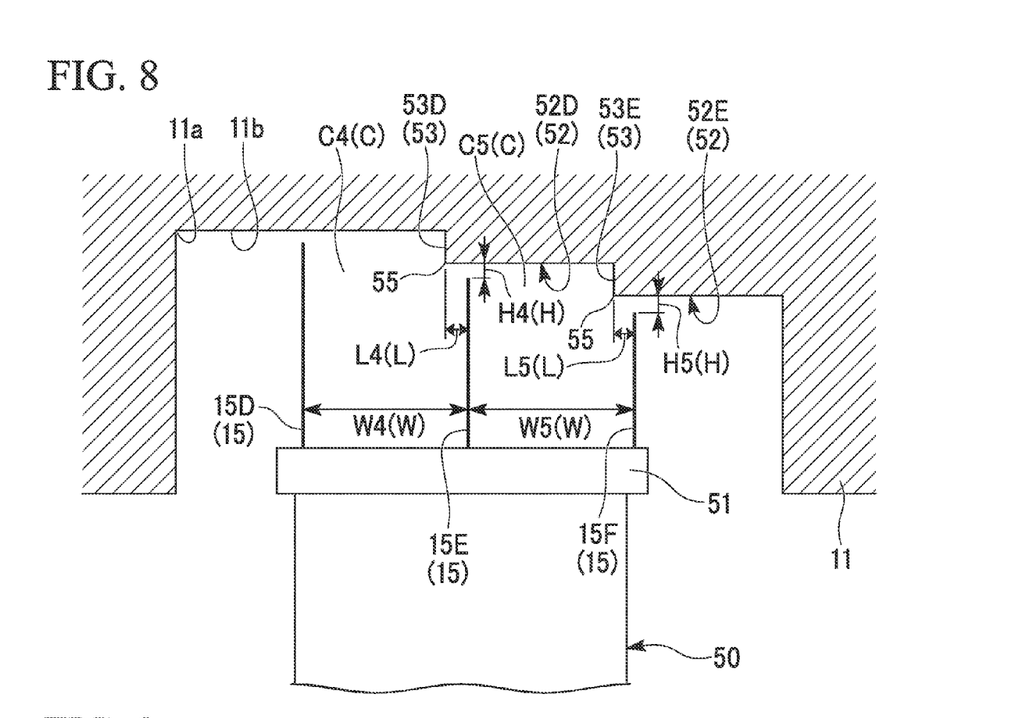
FIG. 8 is a drawing which shows a second embodiment of the present invention and an enlarged sectional view which shows the major part I given in FIG. 1.

FIG. 8 is a drawing for describing the second embodiment. FIG. 8 is also a drawing corresponding to FIG. 2 which is an enlarged sectional view showing the major part I given in FIG. 1.

The second embodiment shown in FIG. 8 is different from the first embodiment shown in FIG. 2 in the following points. That is, in the first embodiment, the stepped parts 52 (52A to 52C) are formed on the tip shroud 51 which is the leading end of the moving blade (blade) 50, and the seal fins 15 (15A to 15C) are installed on the partition plate outer wheel (structure body) 11. On the other hand, in the second embodiment, stepped parts 52 are formed on a partition plate outer wheel (structure body) 11 and seal fins 15 are installed on a tip shroud 51.

That is, in the second embodiment, as shown in FIG. 8, two stepped parts 52 are formed on a groove bottom surface 11b of an annular groove 11a formed on the partition plate outer wheel (structure body) 11. That is, as the two stepped parts 52, there are formed a stepped part 52D having a step surface 53D and a stepped part 52E having a step surface 53E. On the other hand, three seal fins 15 (15D to 15F) are installed on the tip shroud 51 which is the leading end of a moving blade (blade) 50. The three seal fins 15 (15D to 15F) are installed so as to extend to the outside in the radial direction toward the groove bottom surface 11b of the annular groove 11a formed on the partition plate outer wheel 11.

Of these seal fins 15 (15D to 15F), the seal fin 15D on the upstream side extends so as to correspond to the groove bottom surface 11b positioned on the upstream side of the stepped part 52. Further, the seal fins 15E, 15F on the downstream side extend in the radial direction, respectively corresponding to the stepped parts 52D, 52E. Moreover, each of the seal fins 15D to 15F also forms a small space H with the corresponding groove bottom surface 11b or the stepped parts 52. In particular, the seal fins 15E, 15F form the small spaces H (H4, H5) of the present invention in the radial direction with the corresponding stepped parts 52D and 52E.

Each of the small spaces H (H4, H5) is set to the minimum dimensional value within a safety range in which the casing 10 is not in contact with the moving blades 50, with consideration given to elongation of the casing 10 and the moving blades 50 resulting from heat and elongation of the moving blades 50 due to centrifugal force, and so on, as with the first embodiment. In the present embodiment as well, H4 and H5 are equal in dimensions. However, these dimensions may be changed as necessary.

Based on this configuration, the cavities C (C4, C5) are formed between the tip shroud 51 and the partition plate outer wheel 11. The cavities C (C4, C5) are formed inside the annular groove 11a so as to correspond respectively to the stepped parts 52 at every stepped part 52.

As with the first embodiment, the cavities C (C4, C5) are formed between the seal fins 15 (15E, 15F) corresponding respectively to the stepped parts 52 and the partition wall opposing the seal fins 15 on the upstream side.

The cavity C4 which is positioned on the uppermost stream side corresponds to the step 52D which is the first stage positioned on the uppermost stream side. In the first cavity C4, the partition wall is formed by the seal fin 15D positioned on the upstream side. Therefore, the first cavity C4 is formed between the tip shroud 51 and the partition plate outer wheel 11 and also between the seal fin (partition wall) 15D and the seal fin 15E.

Similarly, the second cavity C5 is formed between the tip shroud 51 and the partition plate outer wheel 11 and also between the seal fin (partition wall) 15E and the seal fin 15F.

In these cavities C (C4, C5), a distance in the axial direction between the seal fin 15 which is a partition wall and the seal fin 15 corresponding to the stepped part 52 is given as a cavity width W (W4, W5). Then, the distance between the seal fin 15 and the end edge 55 of the corresponding stepped part 52 on the upstream side, that is, the distance in the axial direction between the seal fin 15 and the edge 55 of the step surface 53 is given as L (L4, L5). Then, at least one of the distances L satisfies the above-described formula (1) above. Further, it is more preferable that at least one of the distances L satisfies the formula (2).

That is, in each of the cavities C4, C5, the formula (1) is satisfied by a small space H and a distance L which are a mutual positional relationship between each of the stepped parts 52D, 52E and each of the corresponding seal fins 15E, 15F as well as a cavity width W which is a mutual positional relationship between the partition wall and the seal fins 15E, 15F. Therefore, the flow contraction effect on leakage flow of the steam S by the separation vortex Y2 is sufficiently increased and the steam S is drastically reduced in the leakage flow rate compared to conventional cases. Therefore, the steam turbine having the above-described seal structure is further reduced in the leakage flow rate of the steam S and increased in performance.

Further, as long as being in a range that satisfies the formula (2), the flow contraction effect by the separation vortex Y2 is further increased and the steam S is further reduced in the leakage flow rate. Therefore, the steam turbine is further increased in performance.

Still further, the steam turbine is provided with the stepped parts formed in two stages and also two cavities C. Thereby, the steam S can be reduced in the leakage flow rate at each of the cavities C by the previously described flow contraction effect. As a whole, a reduction in the leakage flow rate of the steam S can be achieved more sufficiently.

Third Embodiment

Next, a description will be given of the steam turbine of the third embodiment of the present invention.

Figure 9:
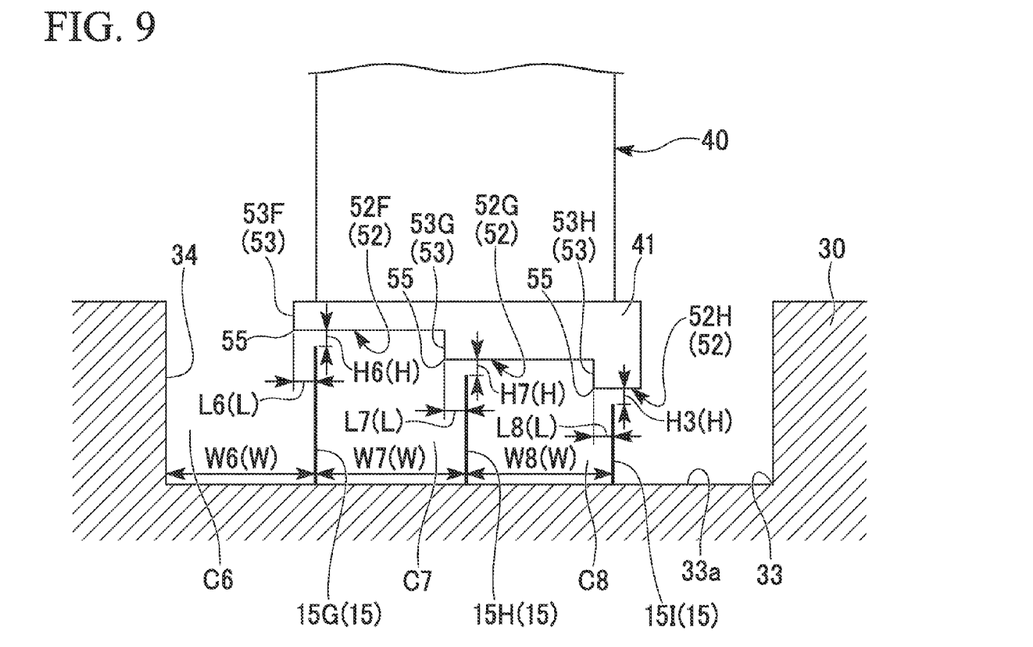
FIG. 9 is a drawing which shows a third embodiment of the present invention and an enlarged sectional view which shows a major part J given in FIG. 1.

FIG. 9 is a drawing for describing the third embodiment and an enlarged sectional view which shows the major part J in FIG. 1. Further, FIG. 9 is a drawing corresponding to FIG. 2.

The third embodiment given in FIG. 9 is different from the first embodiment given in FIG. 2 in the following points. That is, in the first embodiment, the "blade" of the present invention is given as the moving blade 50, and the stepped parts 52 (52A to 52C) are formed on the tip shroud 51 which is the leading end of the moving blade. Further, in the first embodiment, the "structure body" of the present invention is given as the partition plate outer wheel 11 on which the seal fins 15 (15A to 15C) are installed. On the other hand, in the third embodiment, the "blade" of the present invention is given as a stationary blade 40 and stepped parts 52 are formed on the leading end of the stationary blade. Still further, in the third embodiment, the "structure body" of the present invention is given as a shaft body (rotor) 30 on which seal fins 15 are installed.

That is, in the third embodiment, as shown in FIG. 9, a hub shroud 41 extending in the circumferential direction is installed at the leading end of the stationary blade 40. As with the tip shroud 51 of the first embodiment, three stepped parts 52 (52F to 52H) are formed on the hub shroud 41. These three stepped parts 52F to 52H are installed in such a manner that the projection height in the radial direction from the stationary blade 40 becomes gradually higher from the upstream side toward the downstream side. That is, the stepped parts 52F to 52H are formed forward in such a manner that step-forming step surfaces 53 (53F to 53H) face the upstream side.

An annular groove (annular recess) 33 is formed on the shaft body 30 between disks 32, 32 (refer to FIG. 1) which are parts corresponding to the hub shroud 41. The hub shroud 41 is housed inside the annular groove 33. In the present embodiment, the shaft body 30 on a groove bottom surface 33a of the annular groove 33 is formed substantially equal in outer diameter in the axial direction. Further, three seal fins 15 (15G to 15I) extending to the outside in the radial direction toward the hub shroud 41 are installed on the groove bottom surface 33a.

Each of these seal fins 15 (15G to 15I) is installed so as to extend in the radial direction from the groove bottom 33a to the hub shroud 41 and correspond to each of the stepped parts 52 (52F to 52H) on a one-to-one basis. A small space H is formed in the radial direction between each of the seal fins 15 (15G to 15I) and each of the stepped parts 52. Each of the small spaces H (H6 to H8) is set to the minimum dimensional value within a safety range in which the shaft body 30 is not in contact with the stationary blades 40, with consideration given to elongation of the shaft body 30 and the stationary blades 40 resulting from heat and elongation of the shaft body 30 due to centrifugal force, and so on. In the present embodiment as well, H6 to H8 are all equal in dimensions. However, these dimensions may be changed as necessary.

Based on this configuration, cavities C (C6 to C8) are formed between the hub shroud 41 and the shaft body 30. The cavities C (C6 to C8) are formed inside the annular groove 33 so as to correspond respectively to the stepped parts 52 at every stepped part 52.

Each of the cavities C (C6 to C8) is formed between each of the seal fins 15 corresponding to each of the stepped parts 52 and a partition wall opposing the seal fins 15 on the upstream side.

The first cavity C6 corresponds to the step 52F which is the first stage positioned on the uppermost stream side. In the first cavity C6, the partition wall is formed by the inner wall surface 34 of the annular groove 33 on the upstream side. Therefore, the first cavity C6 is formed between the hub shroud 41 side and the shaft body 30 and also between the inner wall surface (partition wall) 34 and the seal fin 15G corresponding to the step 52F which is the first stage.

Further, the second cavity C7 corresponds to the step 52G which is the second stage. In the second cavity C7, the partition wall is formed by the seal fin 15G corresponding to the stepped part 52F positioned on the upstream side in the axial direction. Therefore, the second cavity C7 is formed between the hub shroud 41 and the shaft body 30 and also between the seal fin (partition wall) 15G and the seal fin 15H. Similarly, the third cavity C8 is formed between the hub shroud 41 and the shaft body 30 and also between the seal fin (partition wall) 15H and the seal fin 15I.

In each of the cavities C (C6 to C8), a distance between the partition wall and the seal fin 15 is given as a cavity width W. Then, a distance in the axial direction between each of the seal fins 15 and the end edge of each of the stepped parts 52 on the upstream side, that is, a distance in the axial direction between the seal fin 15 and the edge 55 of the step surface 53 is given as L (L6 to L8). Then, at least one of the distances L satisfies the formula (1) above. Further, it is more preferable that at least one of the distances L satisfies the formula (2).

That is, the formula (1) is satisfied by a small space H and a distance L which are mutual positional relationships between each of the stepped parts 52F to 52H and each of the corresponding seal fins 15G to 15I as well as a cavity width W which is a mutual positional relationship between the partition wall and the seal fins 15. Therefore, the flow contraction effect on leakage flow of the steam S by the separation vortex Y2 is sufficiently increased, and the steam S is drastically reduced in the leakage flow rate compared to conventional cases. Therefore, the steam turbine having the above-described seal structure is further reduced in the leakage flow rate of the steam S and increased in performance.

Further, as long as being in a range that satisfies the formula (2), the flow contraction effect on leakage flow of the steam S by the separation vortex Y2 is further increased and the steam S is further reduced in the leakage flow rate. Therefore, the steam turbine is further increased in performance.

Still further, the steam turbine is provided with the stepped parts formed in three stages and also three cavities C. Thereby, the steam S can be reduced in the leakage flow rate at each of the cavities C by the previously described flow contraction effect. As a whole, a reduction in the leakage flow rate of the steam S can be achieved more sufficiently.

Fourth Embodiment

Next, a description will be given of the steam turbine of the fourth embodiment of the present invention.

Figure 10:
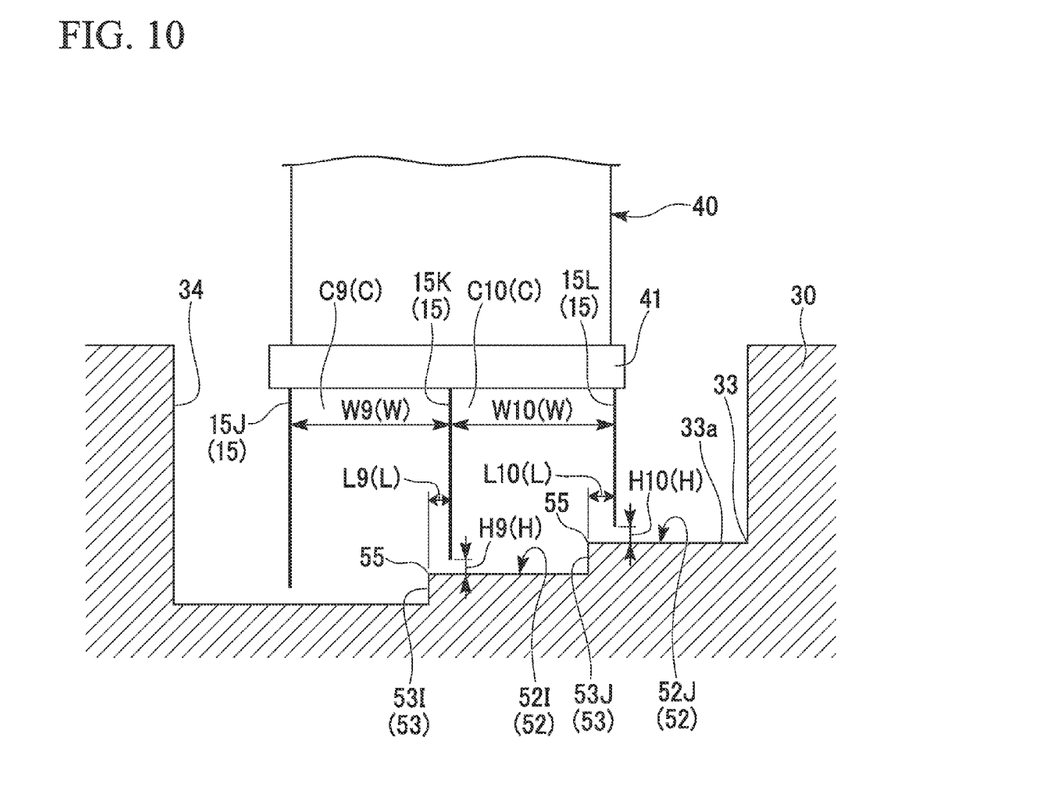
FIG. 10 is a drawing which shows a fourth embodiment of the present invention and an enlarged sectional view which shows the major part J given in FIG. 1.

FIG. 10 is a drawing for describing the fourth embodiment and an enlarged sectional view which shows the major part J shown in FIG. 1. FIG. 10 is also a drawing which corresponds to FIG. 2.

The fourth embodiment shown in FIG. 10 is different from the third embodiment shown in FIG. 9 in the following points. That is, in the third embodiment, the stepped parts 52 (52I, 52J) are formed on the hub shroud 41 which is the leading end of the stationary blade (blade) 40, and the seal fins 15 (15J to 15L) are installed on the shaft body (structure body) 30. On the other hand, in the fourth embodiment, stepped parts 52 are formed on a shaft body (structure body), and seal fins 15 are installed on a hub shroud 41.

That is, in the fourth embodiment, as shown in FIG. 10, two stepped parts 52 are formed on a groove bottom surface 33a on an annular groove 33 formed on the shaft body (structure body) 30. More specifically, these two stepped parts 52 are a stepped part 52I having a step surface 53I and a stepped part 52J having a step surface 53J. On the other hand, the three seal fins 15 (15J to 15L) extending inside in the radial direction toward the groove bottom surface 33a of the shaft body 30 are installed on the hub shroud 41 which is the leading end of the stationary blade (blade) 40.

Of the seal fins 15 (15J to 15L), the seal fin 15J on the upstream side extends in the radial direction so as to correspond to the groove bottom surface 33a positioned on the upstream side of the stepped parts 52. The seal fins 15K, 15L on the downstream side extend in the radial direction so as to correspond respectively to the stepped parts 52I, 52J. It is noted that each of the seal fins 15J to 15L also forms a small space H with the corresponding groove bottom surface 33a or the corresponding stepped parts 52. In particular, the seal fins 15K, 15L form in the radial direction the small space H (H9, H10) of the present invention with the corresponding stepped parts 52I, 52J.

As with the third embodiment, each of the small spaces H (H9, H10) is set to the minimum dimensional value within a safety range in which the shaft body 30 is not in contact with the stationary blades 40, with consideration given to elongation of the shaft body 30 and the stationary blades 40 resulting from heat and elongation of the shaft body 30 due to centrifugal force, and so on. In the present embodiment, H9, H10 are equal in dimensions. However, these dimensions may be changed as necessary.

Based on this configuration, the cavities C (C9, C10) are formed between the hub shroud 41 and the shaft body 30. The cavities C (C9, C10) are formed inside the annular groove 33 so as to correspond respectively to the stepped parts at every stepped parts 52.

As with the third embodiment, each of the cavities C (C9, C10) is formed between each of the seal fins 15 (15K, 15L) corresponding to each of the stepped parts 52 and a partition wall opposing the seal fins 15 on the upstream side.

The first cavity C9 corresponds to the step 52I which is the first stage positioned on the uppermost stream side. In the first cavity C9, the partition wall is formed by the seal fin 15J positioned on the upstream side. Therefore, the first cavity C9 is formed between the hub shroud 41 and the shaft body 30 and also between the seal fin (partition wall) 15J and the seal fin 15K.

Similarly, the second cavity C10 is formed between the hub shroud 41 and the shaft body 30 and also between the seal fin (partition wall) 15K and the seal fin 15L.

In these cavities C (C9, C10), a distance between the seal fin 15, which is a partition wall, and the seal fin 15 corresponding to the stepped part 52 is given as a cavity width W. Then, a distance in the axial direction between the seal fin 15 and the end edge 55 of the stepped part 52 corresponding thereto on the upstream side, that is, the distance in the axial direction between the seal fin 15 and the edge 55 of each of the step surfaces 53 is given as L (L9, L10). Then, at least one of the distances L satisfies the formula (1). Further, it is more preferable that at least one of the distances L satisfies the formula (2).

That is, the formula (1) above is satisfied by a small space H and a distance L which are mutual positional relationships between each of the stepped parts 52I, 52J and each of the corresponding seal fins 15K, 15L as well as a cavity width W which is a mutual positional relationship between the partition wall and the seal fin 15. Therefore, the flow contraction effect on leakage flow of the steam S by the separation vortex Y2 is sufficiently increased and the steam S is drastically reduced in the leakage flow rate compared to conventional cases. Therefore, the steam turbine having the above-described seal structure is further reduced in the leakage flow rate of the steam S and increased in performance.

Further, as long as being in a range that satisfies the formula (2), the flow contraction effect by the separation vortex Y2 is further increased and the steam S is further reduced in the leakage flow rate. Therefore, the steam turbine is further increased in performance.

Still further, the steam turbine is provided with the stepped parts formed in two stages and also two cavities C. Thereby, the steam S can be reduced in the leakage flow rate at each of the cavities C by the previously described flow contraction effect. As a whole, a reduction in the leakage flow rate of the steam S can be achieved more sufficiently.

A description has been so far made for preferred embodiments of the present invention, to which the present invention shall not be, however, restricted. The present invention may be subjected to addition, omission, replacement and other modifications of the configuration within a scope not departing from the gist of the present invention. The present invention shall not be restricted to the above description but will be restricted by the scope of the attached claims.

Procedures shown in the above-described embodiments, shapes and combinations of individual members are only examples and can be modified in various ways based on design requirements, and so on, within a scope not departing from the gist of the present invention.

For example, in the above embodiments, a member on which the seal fins 15 are installed has been formed into a flat shape, not formed into a stepped shape. However, a member on which the seal fins 15 are formed may be formed into a stepped shape in accordance with the shape of the opposing stepped part 52 or an inclined surface or a curved surface may be formed.

Further, in the first embodiment and the second embodiment, the partition plate outer wheel 11 installed on the casing 10 is a structure body. However, in place of providing the partition plate outer wheel 11, the casing 10 itself may be used as a structure body of the present invention. That is, the structure body may be a member which surrounds the moving blades 50 to form a flow channel through which a fluid passes between the moving blades.

Further, in the above embodiment, a plurality of stepped parts 52 are installed and the plurality of cavities C are accordingly formed. However, the stepped parts 52 and the cavities C corresponding thereto may be provided in any given number, for example, one, three, four or more.

Still further, it is not always necessary to provide the seal fins 15 and the stepped parts 52 on a one-to-one basis as described in the above-described embodiments. In addition, it is not always necessary to reduce the number of the stepped parts 52 by one less than that of the seal fins 15. The stepped parts and the seal fins may be provided in any given number.

In addition, in the above embodiments, the present invention has been applied to the moving blades 50 and the stationary blades 40 in the final stage. The present invention may be applied to moving blades 50 and the stationary blades 40 in other stages.

In the above embodiment, the present invention has been applied to a condensing steam turbine. However, the present invention may be applicable to other types of steam turbines, for example, a two-stage extraction turbine, an extraction turbine, and a mixed pressure turbine.

Further, in the above embodiment, the present invention is applied to a steam turbine. However, the present invention is also applicable to a gas turbine. Still further, the present invention is applicable to all rotary machines with rotating blades.

INDUSTRIAL APPLICABILITY

A small space formed between a seal fin and a stepped part is given as H. Further, a distance between a partition wall and a seal fin which form a cavity is given as a cavity width W. Still further, a distance between a seal fin and the end edge of a stepped part on the upstream side is given as L. Here, at least one of the distances L satisfies the following formula (1).

$$0.7H \leq L \leq 0.3W \quad (1)$$

It is, thereby, possible to provide a high performance turbine which is further reduced in the leakage flow rate of a fluid compared to conventional cases.

DESCRIPTION OF REFERENCE NUMERALS

1 . . . steam turbine (turbine), 10 . . . casing, 11 . . . partition plate outer wheel (structure body), 11$a$ . . . annular groove (annular recess), 11$b$ . . . groove bottom surface, 15 (15A to 15L) . . . seal fin, 30 . . . shaft body (structure body), 33 . . . annular groove (annular recess), 33$a$ . . . groove bottom surface, 40 . . . stationary blade (blade), 41 . . . hub shroud, 50 . . . moving blade (blade), 51 . . . tip shroud, 52 (52A to 52J) . . . stepped part, 53 (53A to 53J) . . . step surface, 54 . . . inner wall surface, 55 . . . end edge (edge), C (C1 to C10) . . . cavity, H (H1 to H10) . . . small space, W (W1 to W10) . . . cavity width, L (L1 to L10) . . . distance, S . . . steam, Y1 primary vortex, Y2 . . . separation vortex

The invention claimed is:

1. A turbine for converting energy of a fluid to rotational energy, the turbine comprising:
   a blade;
   a structure body which has a space between the structure body and the leading end of the blade and rotates relatively with respect to the blade;
   a stepped part which is installed at the leading end of the blade and comprising a step surface to project toward the structure body;
   a seal fin which is installed at the structure body to extend toward the stepped part;
   a partition wall which faces the seal fin at the upstream side of the flow of the fluid in a direction parallel to the blade or a rotating shaft of the structure body; and
   a cavity which is formed between the leading end of the blade and the structure body and also between the partition wall and the seal fin; wherein
   when a small space formed between the seal fin and the stepped part is given as H, a distance between the partition wall and the seal fin which form the cavity is given as a cavity width W, and a distance between the seal fin and the end edge of the stepped part on the upstream side is given as L, at least one of the distances L satisfies the following formula (1).

$$0.7H \leq L \leq 0.3W \quad (1).$$

2. The turbine according to claim 1, wherein the distance L satisfies the following formula (2).

$$1.25H \leq L \leq 2.75H (\text{however, } L \leq 0.3W) \quad (2).$$

3. The turbine according to claim 2, wherein
the stepped parts are installed in a plural number in such a manner that the projection height toward the structure body becomes gradually higher from the upstream side toward the downstream side of the flow of the fluid in a direction parallel to the rotating shaft;
the structure body is provided with the seal fins corresponding to each of the stepped parts; and
the seal fin corresponding to the stepped part forms the partition wall which faces a seal fin corresponding to a stepped part adjacent to the downstream side.

4. The turbine according to claim 3, wherein
a part in the structure body corresponding to the leading end of the blade is an annular recess, with the rotating shaft being the central axis, and
the partition wall which faces a seal fin corresponding to a stepped part positioned on the uppermost stream side is formed by an inner wall surface of the recess on the upstream side.

5. The turbine according to claim 1, wherein
the stepped parts are installed in a plural number in such a manner that the projection height toward the structure body becomes gradually higher from the upstream side toward the downstream side of the flow of the fluid in a direction parallel to the rotating shaft;
the structure body is provided with the seal fins corresponding to each of the stepped parts; and
the seal fin corresponding to the stepped part forms the partition wall which faces a seal fin corresponding to a stepped part adjacent to the downstream side.

6. The turbine according to claim 5, wherein
a part in the structure body corresponding to the leading end of the blade is an annular recess, with the rotating shaft being the central axis, and
the partition wall which faces a seal fin corresponding to a stepped part positioned on the uppermost stream side is formed by an inner wall surface of the recess on the upstream side.

7. A turbine for converting energy of a fluid to rotational energy, the turbine comprising:
a blade;
a structure body which has a space between the structure body and the leading end of the blade and rotates relatively with respect to the blade;
a stepped part which is installed at the structure body and having a step surface to project toward the leading end of the blade;
a seal fin which is installed at the leading end of the blade to extend toward the stepped part;
a partition wall which faces the seal fin at the upstream side of the flow of the fluid in a direction parallel to the blade or a rotating shaft of the structure body; and
a cavity which is formed between the leading end of the blade and the structure body and also between the partition wall and the seal fin; wherein
when a small space formed between the seal fin and the stepped part is given as H,
a distance between the partition wall and the seal fin which form the cavity is given as a cavity width W, and
a distance between the seal fin and the end edge of the stepped part on the upstream side is given as L, at least one of the distances L satisfies the following formula (1).

$$0.7H \leq L \leq 0.3W \quad (1).$$

8. The turbine according to claim 7, wherein the distance L satisfies the following formula (2);

$$1.25H \leq L \leq 2.75H (\text{however, } L \leq 0.3W) \quad (2).$$

9. The turbine according to claim 8, wherein
the stepped parts are installed in a plural number in such a manner that the projection height toward the leading end of the blade becomes gradually higher from the upstream side toward the downstream side of the flow of the fluid in a direction parallel to the rotating shaft,
the seal fin is installed at the leading end of the blade so as to correspond to each of the stepped parts, and
the seal fin corresponding to the stepped part forms the partition wall which faces the seal fin corresponding to the stepped part adjacent to the downstream side.

10. The turbine according to claim 9, wherein
a part in the structure body corresponding to the leading end of the blade is an annular recess, with the rotating shaft being the central axis, and
the partition wall which faces a seal fin corresponding to a stepped part positioned on the uppermost stream side is formed by an inner wall surface of the recess on the upstream side.

11. The turbine according to claim 7, wherein
the stepped parts are installed in a plural number in such a manner that the projection height toward the leading end of the blade becomes gradually higher from the upstream side toward the downstream side of the flow of the fluid in a direction parallel to the rotating shaft,
the seal fin is installed at the leading end of the blade so as to correspond to each of the stepped parts, and
the seal fin corresponding to the stepped part forms the partition wall which faces the seal fin corresponding to the stepped part adjacent to the downstream side.

12. The turbine according to claim 11, wherein
a part in the structure body corresponding to the leading end of the blade is an annular recess, with the rotating shaft being the central axis, and
the partition wall which faces a seal fin corresponding to a stepped part positioned on the uppermost stream side is formed by an inner wall surface of the recess on the upstream side.

* * * * *